(12) United States Patent
Cheung et al.

(10) Patent No.: US 7,636,237 B2
(45) Date of Patent: Dec. 22, 2009

(54) INTELLIGENT LOCKING DEVICE, REMOVABLE HDD RECEIVING SYSTEM WITH THE SAME AND METHOD FOR PREVENTING THE REMOVABLE HDD FROM BEING WRONGLY EJECTED THEREFROM

(75) Inventors: KwokChiu Cheung, Dongguan (CN); ShuGuang Li, Dongguan (CN); JianWei Zhu, Dongguan (CN); Yi Wan, Dongguan (CN); ChangLong Deng, Dongguan (CN); ShengQiang Chen, Dongguan (CN); Shuo Chen, Dongguan (CN); XueYang Wang, Dongguan (CN); Feng Chen, Dongguan (CN); DongQiang Xie, Dongguan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 253 days.

(21) Appl. No.: 11/905,503

(22) Filed: Oct. 1, 2007

(65) Prior Publication Data
US 2008/0089022 A1    Apr. 17, 2008

(30) Foreign Application Priority Data
Oct. 10, 2006    (CN)    .................. 2006 1 0135907

(51) Int. Cl.
*G06F 1/16*    (2006.01)
(52) U.S. Cl. ............................................. 361/679.37
(58) Field of Classification Search ................................
361/679.33–679.39, 679.57
See application file for complete search history.

(56) References Cited

U.S. PATENT DOCUMENTS

| | | | | |
|---|---|---|---|---|
| 6,310,777 B1 * | 10/2001 | Knott | .................. | 361/679.37 |
| 6,836,406 B2 * | 12/2004 | Weng et al. | ............ | 361/679.38 |
| 6,882,525 B2 * | 4/2005 | Paul et al. | .............. | 361/679.37 |
| 6,952,342 B1 * | 10/2005 | Chen | ..................... | 361/679.38 |
| 7,251,132 B1 * | 7/2007 | Paul et al. | .............. | 361/679.33 |
| 2007/0177346 A1 * | 8/2007 | Adachi | .................. | 361/679.33 |

\* cited by examiner

*Primary Examiner*—Lisa Lea-Edmonds
(74) *Attorney, Agent, or Firm*—Nixon & Vanderhye P.C.

(57) ABSTRACT

An intelligent locking device comprises a microprocessor, a locking element and a control button electrically connected to the microprocessor respectively. The locking element locks a removable HDD to a computer. The control button generates trigger signals in response to manual push thereon. When receiving the trigger signal, the microprocessor detects whether there is data transferring between the removable HDD and the computer, if there is data transferring, the microprocessor terminates data transferring and then sends a driving signal to the locking element; if not, the microprocessor directly sends a driving signal to the locking element. When receiving the driving signal, the locking element releases the lock between the removable HDD and the computer to permit the removable HDD to be safely ejected. Meanwhile, a removable HDD receiving system with the locking device and a method for preventing the removable HDD from being wrongly ejected from the receiving system are disclosed.

20 Claims, 4 Drawing Sheets

INTELLIGENT LOCKING DEVICE, REMOVABLE HDD RECEIVING SYSTEM WITH THE SAME AND METHOD FOR PREVENTING THE REMOVABLE HDD FROM BEING WRONGLY EJECTED THEREFROM

FIELD OF THE INVENTION

The present invention relates to a protection of a removable HDD, and more particularly to an intelligent locking device and method for preventing the removable HDD from being wrongly ejected while data transferring between the removable HDD and a computer, thereby protecting the removable HDD from data lost and damage, and to a removable HDD receiving system with the intelligent locking device.

BACKGROUND OF THE INVENTION

Removable data storages, such as removable HDD (Hard Disk Drive), and removable CDD (Compact Disk Drive) (including CDROM Drive and Recording CD Drive) have gradually become people's important medium for storing and transferring data. By using the removable data storage, important data on the one hand can be stored, and on the other hand can be transferred, for example, from an office computer to a family computer, which greatly facilitates people storing and transferring data. Hereinafter a removable HDD is taken as an example to illuminate the process of transferring data between the removable data storage and the computer.

FIG. 1 shows a perspective view of a conventional removable HDD receiving bay and a removable HDD. The removable HDD receiving bay 107 is installed in a computer 185 (as broken line in FIG. 1 shows) to contain the removable HDD 101 and assist data transferring between the removable HDD 101 and the computer 185. The receiving bay 107 includes two parallel side plates 104, a base plate 108 connecting with the two side plates 104, and a panel 110 forming on one of the side plates 104 and opposite the base plate 108. The base plate 108 is provided with an electrical connector 106 thereon. The electrical connector is mounted on a circuit board 129. One end of data wires 120 connects with the circuit board 129, and the other end connects with the computer 185 (connection between the data wires 120 and the computer 185 is not shown in figures), thus to electrically connect the electrical connector 106 to the computer 185 by the circuit board 129 and the data wires 120. A mechanical lock 103 with a bolt 109 is mounted on one of the side plates 104 and adjacent to the panel 110.

The removable HDD 101 (the part designated by the reference number 101 is actually a cartridge, the removable HDD is contained in the cartridge, to facilitate describing, the cartridge and the removable HDD contained in the cartridge here is named removable HDD for short) is contained in a space defined by the side plate 104 and the base plate 108 of the receiving bay 107. The removable HDD 101 has an electrical connector 105 on one end thereof matchable with the electrical connector 106 of the receiving bay 107. After the electrical connectors 105, 106 are mated, the removable HDD 101 and the computer 185 are electrically connected, and data are able to be transferred between the removable HDD 101 and the computer 185. During data transferring, to prevent users from wrongly ejecting the removable HDD 101 from the receiving bay 107 which may result in data transferring interruption and even cause data lost and/or the removable HDD 101 damage, the removable HDD 101 and the receiving bay 107 need to be fixed together. Therefore, the receiving bay 107 provides the mechanical lock 103. During data transferring, the bolt 109 of the mechanical lock 103 keeps locking with a slot 108 that is defined in the side of the removable HDD 101. When data transferring is over, users can rotate the mechanical lock 103 by a key 102 to break the bolt 109 away the slot 108, so users can take out the removable HDD 101 from the receiving bay 107.

while the receiving bay 107 can fix the removable HDD 101 by the mechanical lock 103, the conventional receiving bay 107 can not detect working state of the removable HDD 101, namely the receiving bay 107 can not detect whether the removable HDD is transferring data or not with the computer 185. Thus, once users wrongly unbolt the mechanical lock 103 with the key 102 and pull out the removable HDD 101 which is doing data transfer with the computer 185, this will be very easy to induce data lost and the removable HDD 101 damage.

Therefore, there is a need for an improved device and a method to overcome these above-mentioned disadvantages.

SUMMARY OF THE INVENTION

Accordingly, a main object of the present invention is to provide an intelligent locking device for controlling the connection/disconnection of a removable HDD and a receiving bay of a computer, which prevents the removable HDD from being wrongly ejected from the receiving bay of the computer during data transferring, thereby protecting the removable HDD from data lost and damage.

Another object of the present invention is to provide a removable HDD receiving system for a computer to ensure data transferring safely between the removable HDD and the computer, thereby protecting the removable HDD from data lost and damage.

Yet another object of the present invention is to provide a method for preventing the removable HDD from being wrongly ejected from a receiving bay of a computer, thereby protecting the removable HDD from data lost and damage.

To achieve the above objects, the present invention provides an intelligent locking device which comprises a microprocessor, a locking element electrically connected to the microprocessor for locking the removable HDD to the receiving bay of a computer, and a control button electrically connected to the microprocessor. The control button generates trigger signals in response to manual push thereon. When receiving a trigger signal from the control button, the microprocessor detects whether there is data transferring between the removable HDD and the computer, if there is data transferring, the microprocessor terminates data transferring and then sends a driving signal to the locking element; if there is no data transferring, the microprocessor directly sends a driving signal to the locking element. When receiving the driving signal from the microprocessor, the locking element releases the lock between the removable HDD and the receiving bay to permit the removable HDD to be safely ejected.

In an embodiment of this invention, the microprocessor electrically connects the control button and the locking element respectively by conductive wires. The locking element is a solenoid lock.

Furthermore, the receiving bay includes two parallel side plates, a base plate which connects with the two side plates, and a panel which forms on one of the side plates and is opposite to the base plate. The locking element is mounted on one side plate, the microprocessor is mounted on the base plate, and the control button is mounted on the panel.

The intelligent locking device further comprises a position detector mounted on the base plate of the receiving bay and electrically connecting with the microprocessor to detect whether the removable HDD is fully inserted into the receiving bay.

The intelligent device further comprises a display mounted on the panel of the receiving bay and electrically connecting with the microprocessor. The display serves to indicate the physical connection status between the removable HDD and the receiving bay, data transferring status between the removable HDD and the computer, and clew information to tell users whether it is safe to eject the removable HDD. Concretely, the display is an LED or an LCD.

In addition, an elastic element is mounted on the base plate of the receiving bay to automatically eject the removable HDD from the receiving bay after the locking element releases the lock. Concretely, the elastic element is a compression spring or an elastic rubber.

The present invention provides a removable HDD receiving system which comprises a receiving bay and an intelligent locking device mounted on the receiving bay. The intelligent locking device includes a microprocessor, a locking element electrically connected to the microprocessor for locking the removable HDD to the receiving bay, and a control button electrically connected to the microprocessor. The control button generates trigger signals in response to manual push thereon. When receiving a trigger signal from the control button, the microprocessor detects whether there is data transferring between the removable HDD and the computer, if there is data transferring, the microprocessor interrupts data transferring and then sends a driving signal to the locking element; if there is no data transferring, the microprocessor directly sends a driving signal to the locking element. When receiving the driving signal from the microprocessor, the locking element releases the lock between the removable HDD and the receiving bay to permit the removable HDD to be safely ejected.

In an embodiment of the invention, the receiving bay includes two parallel side plates, a base plate which connects with the two side plates, and a panel which forms on one of the side plates and is opposite to the base plate. The locking element is mounted on one side plate, the microprocessor is mounted on the base plate, and the control button is mounted on the panel.

The intelligent locking device further comprises a position detector mounted on the base plate of the receiving bay and electrically connecting with the microprocessor to detect whether the removable HDD is fully inserted into the receiving bay.

The receiving system further comprises a first display and a second display which are mounted on the panel of the receiving bay and electrically connect with the microprocessor respectively. When the position detector detects the removable HDD is fully inserted into the receiving bay, the microprocessor sends an order to the first display to light the first display up to indicate that the removable HDD has been fully inserted into the receiving bay, and at the same time, the microprocessor orders the locking element to lock the removable HDD. Once the removable HDD is locked, the microprocessor sends an order to the second display to light the second display up to indicate that the removable HDD has been locked. The first display also serves to indicate whether there is data transferring between the removable HDD and the computer, if the microprocessor detects that there is data transferring, the microprocessor orders the first display to keep flickering. The second display also servers to indicate whether it is safe to remove the removable HDD, if the microprocessor detects that the locking element has released the lock between the removable HDD and the receiving bay, the microprocessor orders the second display to keep flicking to tell user that it is safe to remove the removable HDD.

A method for preventing a removable HDD from being wrongly ejected from the receiving system according to the present invention is provided. The method comprises the steps of: (1) detecting whether the control button is pushed, if the control button is not pushed, the locking element keeping locking the removable HDD, if the control button is pushed, the control button generating a trigger signal and sending the trigger signal to the microprocessor; (2) when receiving the trigger signal, the microprocessor detecting whether there is data transferring between the removable HDD and the computer, if there is data transferring, the microprocessor terminating data transferring and then sending a driving signal to the locking element, if there is no data transferring, the microprocessor directly sending a driving signal to the locking element; (3) when receiving the driving signal, the locking element releasing the lock between the removable HDD and the receiving bay to permit the removable HDD to be safely ejected.

The receiving system further comprises a display which is mounted on the receiving bay and electrically connects with the microprocessor. The method further comprises a step of: after the locking element has released the lock between the removable HDD and the receiving bay, the microprocessor ordering the display to keep flicking to tell user that it is safe to remove the removable HDD.

When data transferring, the intelligent locking device automatically fixes the removable HDD in the receiving bay to prevent the removable HDD from being ejected. When the intelligent locking device detects a signal that denotes users want to eject the removable HDD, the intelligent locking device firstly terminates data transferring and then releases the lock of the removable HDD to permit the removable HDD to be ejected, thus to prevent the removable HDD from being wrongly ejected and protect the removable HDD from data lost and damage.

Other aspects, features, and advantages of this invention will become apparent from the following detailed description when taken in conjunction with the accompanying drawings, which are a part of this disclosure and which illustrate, by way of example, principles of this invention.

DETAILED DESCRIPTION OF ILLUSTRATED EMBODIMENTS

Figure 1:
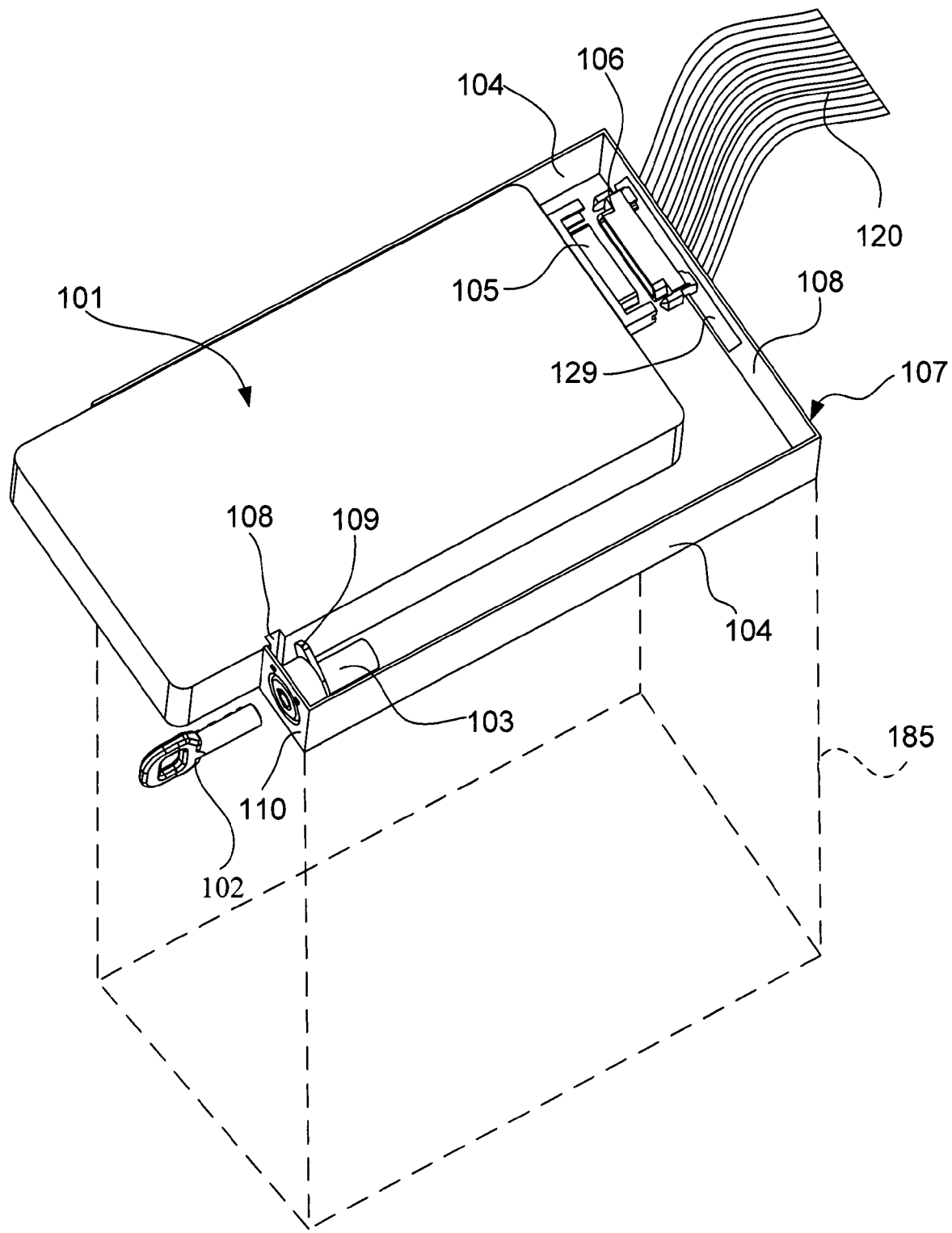
FIG. 1 is a perspective view of a conventional removable HDD receiving bay and a removable HDD to be inserted into the receiving bay, and also showing a computer in broken line.
Figure 2:
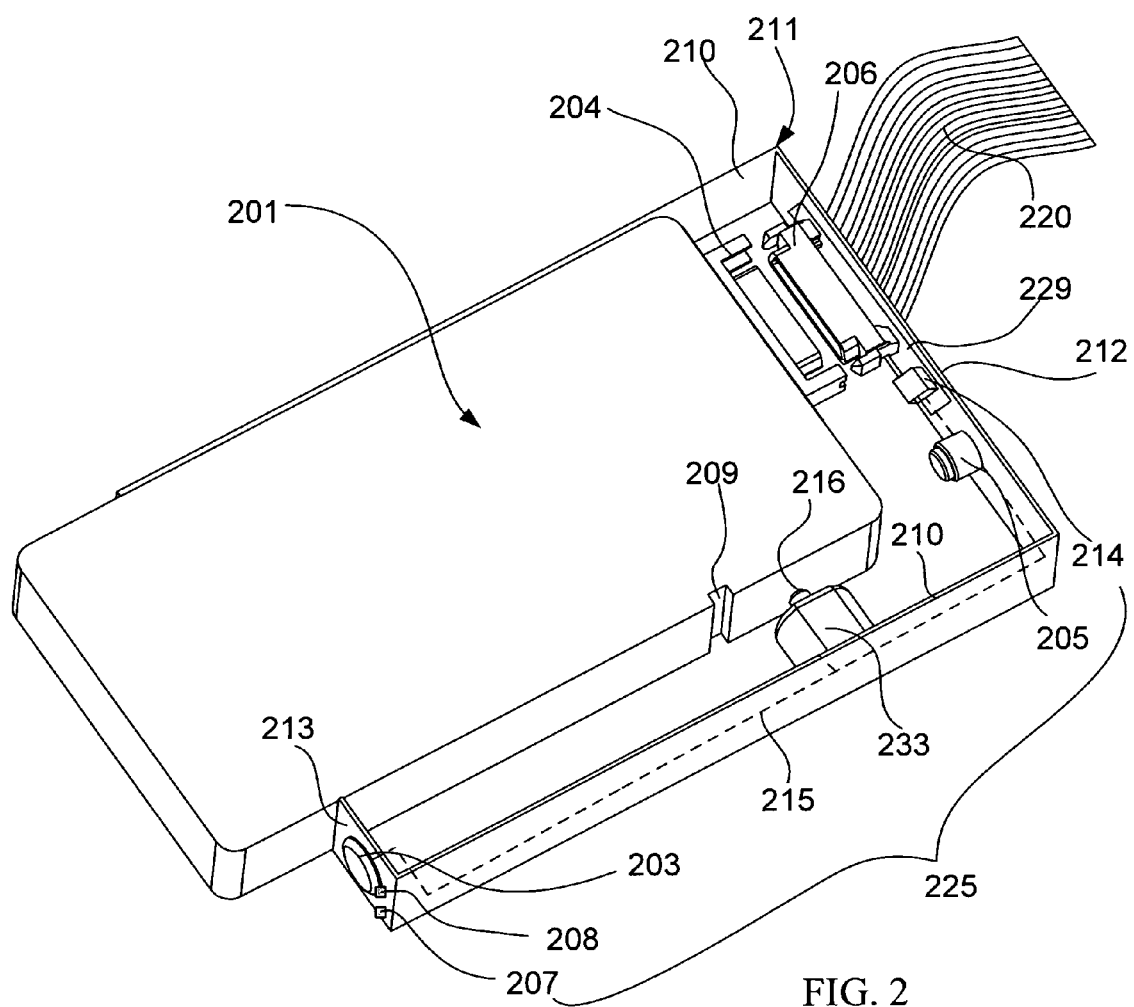
FIG. 2 is a perspective view of an embodiment of a removable HDD receiving system and a removable HDD to be inserted into the receiving system in accordance with the present invention.

Various preferred embodiments of the instant invention will now be described with reference to the figures, wherein like reference numerals designate similar parts throughout the various views. FIG. 2 shows an embodiment of an intelligent locking device 225 for preventing a removable HDD 201 from being wrongly ejected from a removable HDD receiving bay 211 during data transferring in accordance with the present invention, thereby protecting the removable HDD 201 from data lost and damage. As FIG. 2 shows, the receiving bay 211 includes two parallel side plates 210, a base plate 212 which connects with two side plates 210 and a panel 213 which is formed on one of the side plates 210 and is opposite to the base plate 212. The base plate 212 provides a circuit board 229, and an electrical connector 206 is mounted on the circuit board 229. One end of data wires 220 connects with the circuit board 229 (data wires 220 electrically connect with the circuit board 229 by an individual electrical connector, and the electrical connector is not shown in FIG. 2), and the other end connects with a computer (not shown in figures), thus the electrical connector 206 is electrically connected with the computer by the circuit board 229 and the data wires 220. The removable HDD 201 is contained in a space defined by the side plate 210 and the base plate 212 of the receiving bay 211. The removable HDD 201 has an electrical connector 204 on one end thereof matchable with the electrical connector 206 of the receiving bay 211. After the electrical connectors 204, 206 are mated, the removable HDD 201 and the computer are electrically connected, and data can be transferred between the removable HDD 201 and the computer. Moreover, a slot 209 is defined in the side of the removable HDD 201 for engaging with a locking element 223 of the intelligent locking device 225.

The intelligent locking device 225 is mounted on the receiving bay 211, and the intelligent locking device 225 includes a microprocessor 214, a locking element 233, and a control button 203. The microprocessor 214 electrically connects the control button 203 and the locking element 233 respectively by conductive wires 215. The microprocessor 214 is mounted on the circuit board 229 of the base plate 212, the locking element 223 is mounted on one side plate 210 of the receiving bay 211, and the control button 203 is mounted on the panel 213 of the receiving bay 211.

The microprocessor 214 serves as detecting triggering signals from the control button 203 and controlling motion of the locking element 233. The locking element 233 is used for locking the removable HDD 201 contained in the receiving bay 211 to the receiving bay 211. Concretely, the locking element 233 is a solenoid lock or any other kind of electric locking element which is able to be controlled by the microprocessor 214. Particularly, a telescopic pin 216 is formed on the locking element 233. When protruded from the locking element 233, the telescopic pin 216 engages with the slot 209, thus to lock the removable HDD 201 in the receiving bay 211. The control button 203 generates trigger signals in response to manual push thereon which drive the microprocessor 214 to release the lock between the removable HDD 201 and the receiving bay 211.

During data transferring between the removable HDD 201 and the computer and there is no push on the control button 203, the locking element 233 keeps locking the removable HDD 201 in the receiving bay 211 all the time. Thus, once users are about to pull the removable HDD 201 out of the receiving bay 211 because of incaution or incomprehension the operation criterion of the removable HDD, due to the removable HDD 201 is fixed in the receiving bay 211 by the locking element 233 of the intelligent locking device 225, the removable HDD 201 can not be ejected, thereby ensuring data safely transferring and protecting the removable HDD 201 from damage. Only when users push on the control button 203, the removable HDD 201 is permitted to be ejected from the receiving bay 211. The detailed process of ejecting the removable HDD is: after users pushing on the control button 203, the control button 203 generates a trigger signal and sends the trigger signal to the microprocessor 214; after receiving the trigger signal, the microprocessor 214 terminates data transferring to protect the removable HDD 201 from data lost, then sends a driving signal to the locking element 233; after receiving the driving signal, the locking element 233 releases the lock of the removable HDD 201; after releasing the lock, users can pull the removable HDD 201 out safely, thus to ensure data safely transferring and protect the removable HDD 201 from damage.

In additional, as FIG. 2 shows, the intelligent locking device 225 further includes a position detector 205 to detect whether the removable HDD 201 is fully inserted into the receiving bay 211. The position detector 205 is mounted on the base plate 212 of the receiving bay 211 and electrically connects with the microprocessor 214. Only after the position detector 205 detecting the virtual connection between the removable HDD 201 and the receiving bay 211, the position detector 205 feedbacks a signal of virtual connection to the microprocessor 214. Then, the microprocessor 214 orders the locking element 233 to fix the removable HDD 201 in the receiving bay 211, thereby ensuring data transferring between the removable HDD 201 and the computer.

As FIG. 2 shows, to facilitate users visually observing the working status of the removable HDD 201 and hereby making an immediate response, the intelligent locking device 225 further provides a pair of display 207, 208 mounted on the panel 213 of the receiving bay 211 and electrically connecting with the microprocessor 214. The pair of display 207, 208 serves as indicating the physical connection status between the removable HDD 201 and the receiving bay 211, data transferring status between the removable HDD 201 and the computer, and clew information to tell users whether it is safe to eject the removable HDD 201. Preferably, the display is an LED or an LCD. In this embodiment, the display is a pair of LEDS 207, 208.

Figure 3:
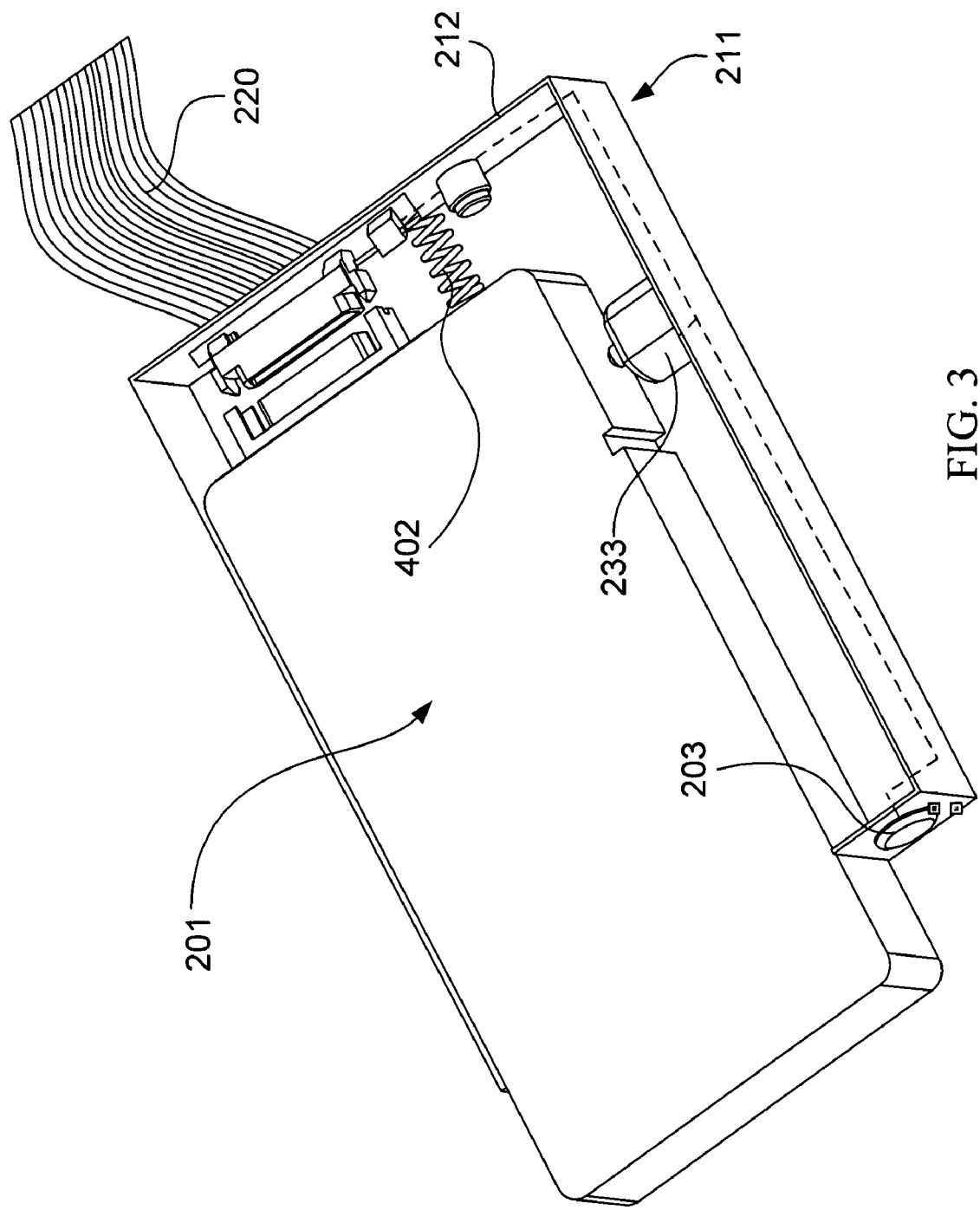
FIG. 3 is a perspective view of another embodiment of a removable HDD receiving system and a removable HDD to be inserted into the receiving system in accordance with the present invention.

FIG. 3 shows an intelligent locking device according to another embodiment of the present invention. The intelligent locking device is similar with the intelligent locking device shown in FIG. 2 except adding an elastic element 402 between the removable HDD 201 and the base plate 212 of the receiving bay 211 to automatically eject the removable HDD 201 from the receiving bay 211 after the removable is unlocked. The elastic element 402 is mounted on the base plate 212 of the receiving bay 211. Concretely, the elastic element 402 is a compression spring or an elastic rubber. By arranging the elastic element 402, the invention further realizes a function that the removable HDD 201 can be automatically ejected from the receiving bay 211, so the design is convenient for users to pull the removable HDD 201.

As best shown in FIG. 2, a removable HDD receiving system in accordance with the present invention is formed by installing the intelligent locking device 225 in the receiving bay 221. The removable HDD receiving system includes a receiving bay 211 and an intelligent locking device 225 mounted on the receiving bay 211. The intelligent locking device 225 includes a microprocessor 214, a locking element 233, and a control button 203. The receiving bay 211 has two parallel side plates 210, a base plate 212 which connects with two side plates 210, and a panel 213 which is formed on one of the side plates 210 and opposite the base plate 212. The removable HDD 201 is contained in a space defined by the two side plates 210 and the base plate 212 of the receiving bay 211. The locking element 233 keeps locking the removable HDD 201 contained in the receiving bay 211 to the receiving bay 211 during data transferring. The control button 203 is used to drive the microprocessor 214 and, in turn, the locking element 233 to release the lock between the removable HDD 201 and the receiving bay 211. The microprocessor 214 electrically connects with the locking element 223 and the control button 203 respectively. When the control button 203 is pushed, the microprocessor 214 terminates data transferring between the removable HDD 201 and the computer first, then drives the locking element 233 to release the lock between the removable HDD 201 and the receiving bay 211.

Comparing with the prior art, because the intelligent locking device of the present invention can ensure the removable HDD be fixed in the receiving bay all the time during data transferring, the users can not directly pull the removable HDD out, thus to ensure safe data transferring and protect the removable HDD from damage. Simultaneity, the intelligent locking device can detect whether the removable HDD is fully inserted into the receiving bay, thereby ensuring normally operating between the removable HDD and the computer.

Figure 4:
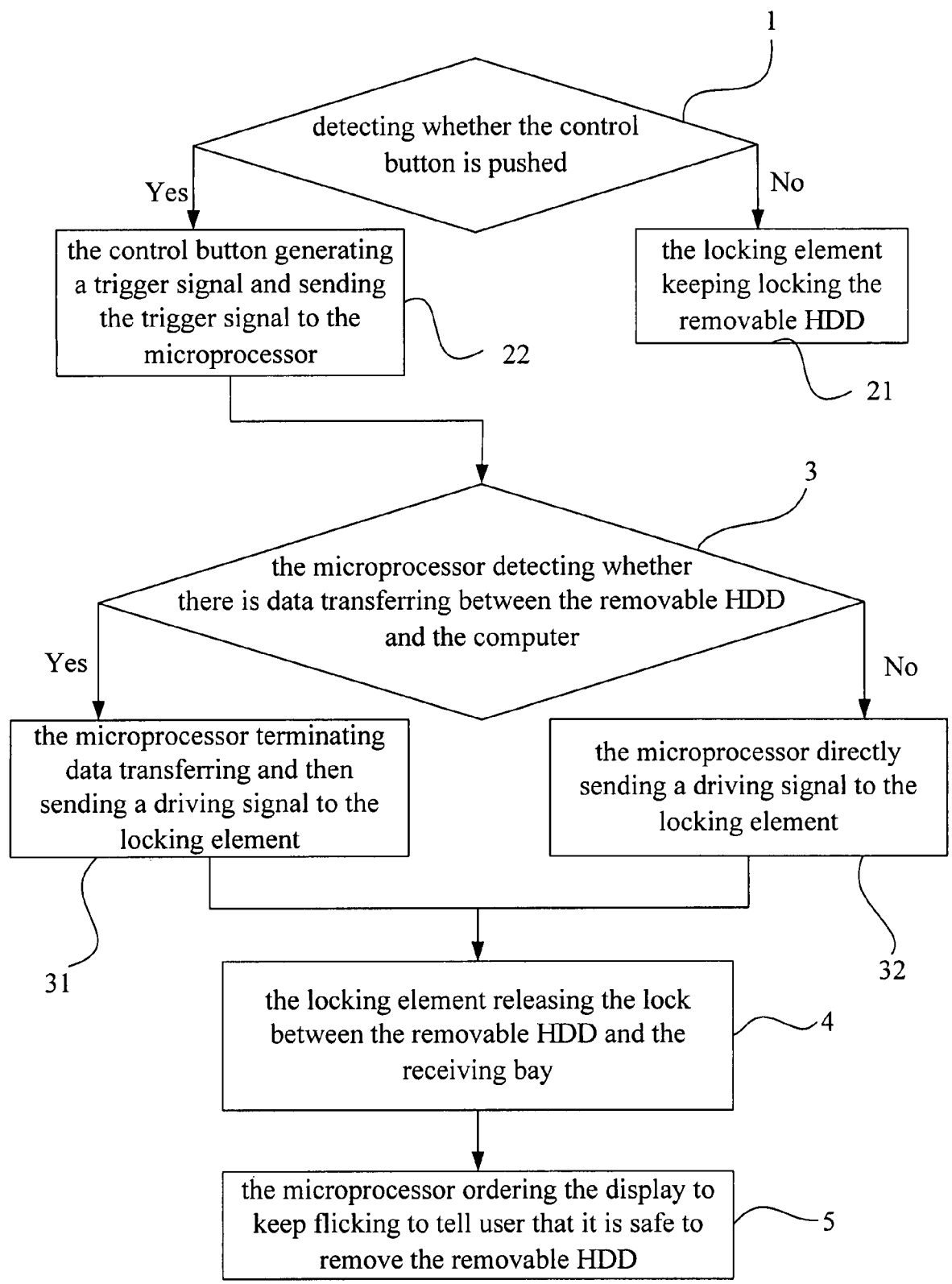
FIG. 4 is a flow chart of an embodiment of a method for preventing the removable HDD from being wrongly ejected from the receiving system while data transferring between the removable HDD and the computer in accordance with the present invention.

FIG. 4 illustrates a method for preventing the removable HDD from being wrongly ejected from the receiving system according to the present invention. The method comprises the steps of: (1) detecting whether the control button is pushed, if the control button is not pushed, executing step (21) the locking element keeping locking the removable HDD, if the control button is pushed, executing step (22) the control button generating a trigger signal and sending the trigger signal to the microprocessor; (3) when receiving the trigger signal, the microprocessor detecting whether there is data transferring between the removable HDD and the computer, if there is data transferring, executing step (31) the microprocessor terminating data transferring and then sending a driving signal to the locking element, if there is no data transferring, executing step (32) the microprocessor directly sending a driving signal to the locking element; (4) when receiving the driving signal, the locking element releasing the lock between the removable HDD and the receiving bay to permit the removable HDD to be safely ejected; (5) the microprocessor ordering the display to keep flicking to tell user that it is safe to remove the removable HDD.

Here, taken in conjunction with FIG. 2 to illuminate the work of the pair of display (LEDS 207, 208) in the working process of the removable HDD receiving system. The first display is the first LED 207, and the second display is the second LED 208, all of which are mounted on the panel 213 of the receiving bay 211 and electrically connect with the microprocessor 214 respectively. When the position detector 205 detects the removable HDD 201 is fully inserted into the receiving bay 211, the microprocessor 214 sends an order to the first LED 207 to light the first LED 207 up to indicate that the removable HDD 201 has been fully inserted into the receiving bay 211, and at the same time, the microprocessor 214 orders the locking element 233 to lock the removable HDD 201. Once the removable HDD 201 is locked, the microprocessor 214 sends an order to the second LED 208 to light the second LED 208 up to indicate that the removable HDD 201 has been locked. The first LED 207 also serves to indicate whether there is data transferring between the removable HDD 201 and the computer. If the microprocessor 214 detects that there is data transferring, the microprocessor 214 orders the first LED 207 to keep flickering. At this time, the second LED 208 keeps lighting. The second LED 208 also servers to indicate whether it is safe to remove the removable HDD 201. If the microprocessor 214 detects that the locking element 233 has released the lock between the removable HDD 201 and the receiving bay 211, the microprocessor 214 orders the second LED 208 to keep flicking to tell user that it is safe to remove the removable HDD 201. At this time, the first LED 207 keeps lighting. After the removable HDD 201 is removed, the first and the second LEDS 207, 208 both turn off. By arranging the display, users can make immediate responses according to the indication status of the display, so the design is convenient for users operation.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. An intelligent locking device for controlling the connection/disconnection between a removable HDD and a receiving bay of a computer, comprising:
   a microprocessor;
   a locking element electrically connected to the microprocessor for locking the removable HDD to the receiving bay; and
   a control button electrically connected to the microprocessor; wherein the control button generates trigger signals in response to manual push thereon;
   when receiving a trigger signal from the control button, the microprocessor detects whether there is data transferring between the removable HDD and the computer, if there is data transferring, the microprocessor terminates data transferring and then sends a driving signal to the locking element; if there is no data transferring, the microprocessor directly sends a driving signal to the locking element;
   when receiving the driving signal from the microprocessor, the locking element releases the lock between the removable HDD and the receiving bay.

2. The intelligent locking device according to claim 1, wherein the microprocessor electrically connects the control button and the locking element respectively by conductive wires.

3. The intelligent locking device according to claim 1, wherein the receiving bay includes two parallel side plates, a base plate which connects with the two side plates, and a panel which forms on one of the side plates and is opposite to the base plate; the locking element is mounted on one of the side plates; the microprocessor is mounted on the base plate; and the control button is mounted on the panel.

4. The intelligent locking device according to claim 1, wherein the locking element is a solenoid lock.

5. The intelligent locking device according to claim 3, further comprising a position detector which is mounted on the base plate of the receiving bay and electrically connects with the microprocessor.

6. The intelligent locking device according to claim 5, further comprising a display which is mounted on the panel of the receiving bay and electrically connects with the microprocessor.

7. The intelligent locking device according to claim 6, wherein the display is an LED or an LCD.

8. The intelligent locking device according to claim 3, further comprising an elastic element mounted on the base plate of the receiving bay.

9. The intelligent locking device according to claim 8, wherein the elastic element is a compression spring or an elastic rubber.

10. A removable HDD receiving system comprising:
a receiving bay; and
an intelligent locking device mounted on the receiving bay, the intelligent locking device including a microprocessor, a locking element electrically connected to the microprocessor for locking the removable HDD to the receiving bay, and a control button electrically connected to the microprocessor; wherein
the control button generates trigger signals in response to manual push thereon;
when receiving a trigger signal from the control button, the microprocessor detects whether there is data transferring between the removable HDD and the computer, if there is data transferring, the microprocessor terminates data transferring and then sends a driving signal to the locking element; if there is no data transferring, the microprocessor directly sends a driving signal to the locking element;
when receiving the driving signal from the microprocessor, the locking element releases the lock between the removable HDD and the receiving bay.

11. The removable HDD receiving system according to claim 10, wherein the receiving bay includes two parallel side plates, a base plate which connects with the two side plates, and a panel which forms on one of the side plates and opposite the base plate; the locking element is mounted on one of the two side plates; the microprocessor is mounted on the base plate; and the control button is mounted on the panel.

12. The removable HDD receiving system according to claim 11, further comprising a position detector which is mounted on the base plate of the receiving bay and electrically connects with the microprocessor for detecting whether the removable HDD is fully inserted into the receiving bay.

13. The removable HDD receiving system according to claim 12, further comprising a first display which is mounted on the panel of the receiving bay and electrically connects with the microprocessor, wherein when the position detector detects the removable HDD is fully inserted into the receiving bay, the microprocessor sends an order to the first display to light the first display up to indicate that the removable HDD has been fully inserted into the receiving bay, and at the same time, the microprocessor orders the locking element to lock the removable HDD.

14. The removable HDD receiving system according to claim 13, wherein the first display also serves to indicate whether there is data transferring between the removable HDD and the computer, if the microprocessor detects that there is data transferring, the microprocessor orders the first display to keep flickering.

15. The removable HDD receiving system according to claim 12, further comprising a second display which is mounted on the panel of the receiving bay and electrically connects with the microprocessor, wherein once the removable HDD is locked, the microprocessor sends an order to the second display to light the second display up to indicate that the removable HDD has been locked.

16. The removable HDD receiving system according to claim 15, wherein the second display also servers to indicate whether it is safe to remove the removable HDD, if the microprocessor detects that the locking element has released the lock between the removable HDD and the receiving bay, the microprocessor orders the second display to keep flicking to tell user that it is safe to remove the removable HDD.

17. The removable HDD receiving system according to claim 11, further comprising an elastic element mounted on the base plate of the receiving bay.

18. The removable HDD receiving system according to claim 10, wherein the locking element is a solenoid lock.

19. A method for preventing a removable HDD from being wrongly ejected from the receiving system as claimed in claim 10 while data transferring between the removable HDD and a computer, comprising the steps of:
(1) detecting whether the control button is pushed, if the control button is not pushed, the locking element keeping locking the removable HDD, if the control button is pushed, the control button generating a trigger signal and sending the trigger signal to the microprocessor;
(2) when receiving the trigger signal, the microprocessor detecting whether there is data transferring between the removable HDD and the computer, if there is data transferring, the microprocessor terminating data transferring and then sending a driving signal to the locking element, if there is no data transferring, the microprocessor directly sending a driving signal to the locking element; and
(3) when receiving the driving signal, the locking element releasing the lock between the removable HDD and the receiving bay to permit the removable HDD to be safely ejected.

20. The method according to claim 19, wherein the receiving system further comprises a display which is mounted on the receiving bay and electrically connects with the microprocessor, when the locking element has released the lock between the removable HDD and the receiving bay, the microprocessor orders the display to keep flicking to tell user that it is safe to remove the removable HDD.

* * * * *